R. F. BOSARD.
MEANS FOR USING AUTOMOBILE POWER INDUSTRIALLY.
APPLICATION FILED MAR. 30, 1921.
1,407,513.
Patented Feb. 21, 1922.
2 SHEETS—SHEET 1.
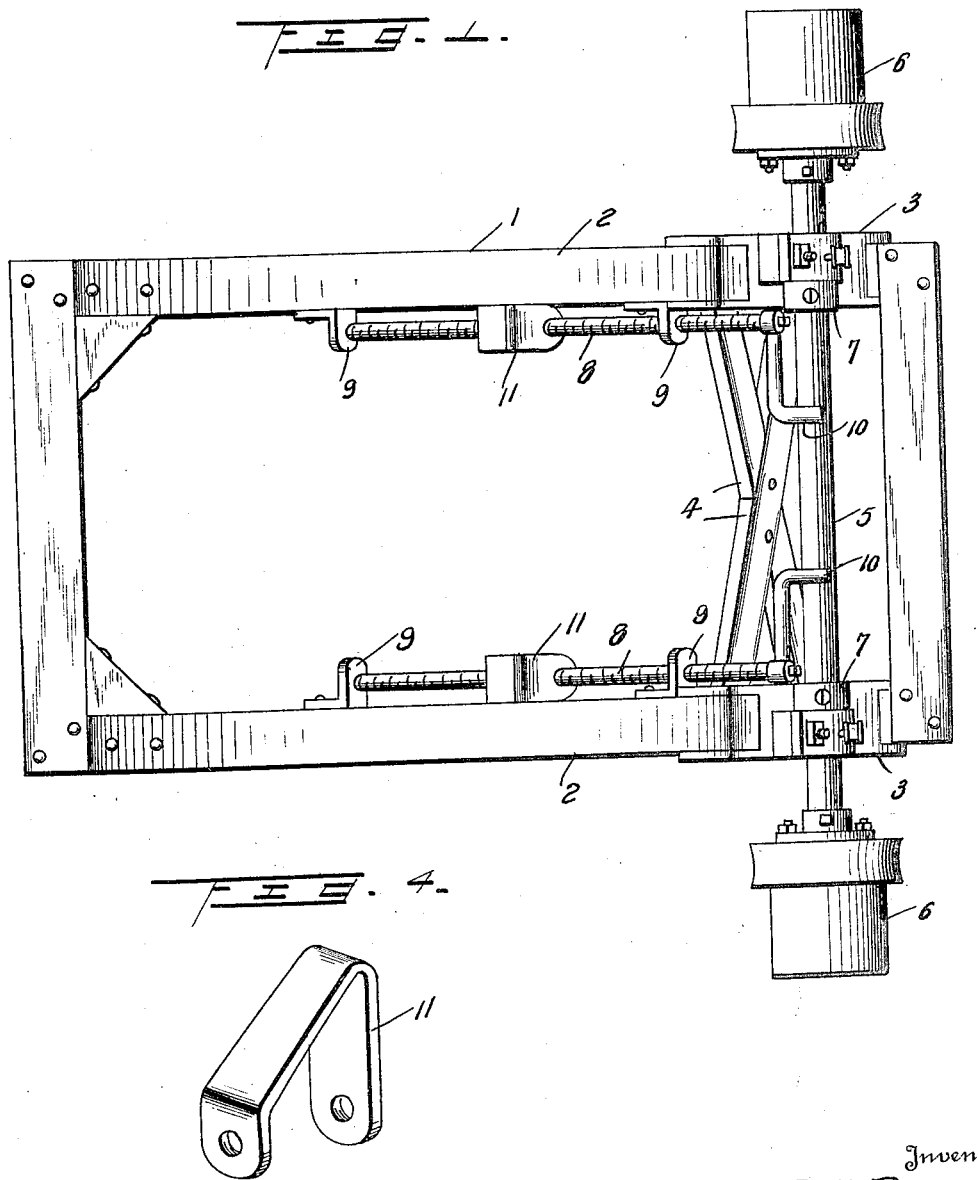
Inventor
R. F. Bosard
By
Attorney R. F. BOSARD.
MEANS FOR USING AUTOMOBILE POWER INDUSTRIALLY.
APPLICATION FILED MAR. 30, 1921.
1,407,513.
Patented Feb. 21, 1922.
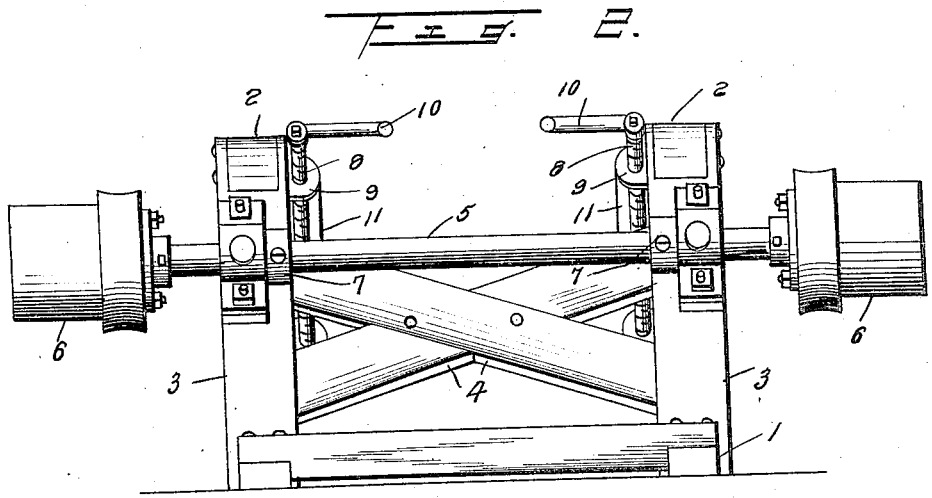
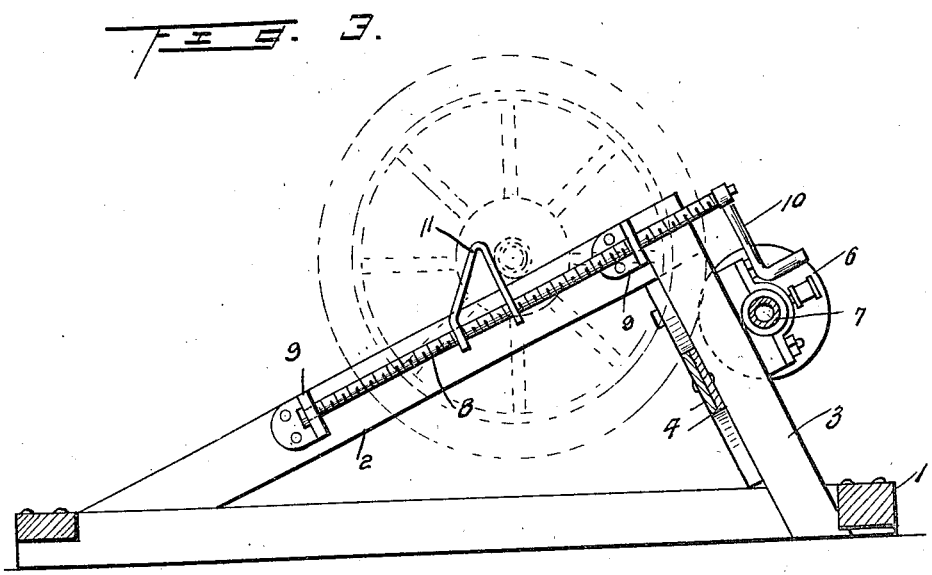
Inventor
R. F. Bosard

UNITED STATES PATENT OFFICE.

RAY F. BOSARD, OF KNOXVILLE, PENNSYLVANIA.

MEANS FOR USING AUTOMOBILE POWER INDUSTRIALLY.

1,407,513.    Specification of Letters Patent.    Patented Feb. 21, 1922.

Application filed March 30, 1921. Serial No. 456,850.

*To all whom it may concern:*

Be it known that I, RAY F. BOSARD, a citizen of the United States, residing at Knoxville, in the county of Tioga and State of Pennsylvania, have invented certain new and useful Improvements in Means for Using Automobile Power Industrially; and I do hereby declare the following to be a full, clear, and exact description of the invention, such as will enable others skilled in the art to which it appertains to make and use the same.

The primary object of this invention is the utilization of an automobile in the industrial art for driving light machinery such as a saw for cutting fire wood, a grain separator, thresher or stacker, or any mechanism usually operated by means of a portable engine.

The invention consists of a frame having inclined ways, a shaft mounted on the frame and provided at opposite ends with pulleys for cooperation with the drive wheels of an automobile, and means for drawing the rear axle of the automobile upon the ways of the frame to bring the drive wheels in contact with the pulleys of the shaft and maintain such contact to the end that said shaft may be driven and power taken therefrom for operating the machine or device to be actuated.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of the appliance,

Figure 2 is an end view thereof,

Figure 3 is a vertical central longitudinal section, the dotted lines showing the rear axle of an automobile mounted upon the frame and a drive wheel thereof in contact with a shaft pulley, and Figure 4 is a detail perspective view of one of the stops.

Corresponding and like parts are referred to in the following description and designated in the several views of the drawings by like reference characters.

The appliance comprises a main frame including a rectangular base 1, inclined side beams 2, end uprights 3, slightly inclined to the vertical and connecting the upper ends of the side beams 2 with the base 1 and cross braces 4 connecting the uprights 3. The side beams 2 constitute the inclined ways upon which the rear axle of the automobile is mounted, as indicated by the dotted lines in Figure 3. The uprights 3 are incllined reversely to the side beams 2, whereby to provide a substantial and durable structure.

A horizontal shaft 5 is mounted in bearings secured to the uprights 3 and its opposite ends project some distance beyond the sides of the frame and receive pulleys 6 which are fast thereto. The pulleys 6 are stepped, their outer ends being reduced to receive the drive belt, not shown, whereby power may be taken from the shaft 5 for operating the machine or device to be driven. The inner enlarged end of each of the pulleys 6 is adapted to make contact with a drive wheel of the automobile, as indicated by the dotted lines in Figure 3. The shaft 5 is prevented from endwise play in its bearings and for this purpose collars 7 are secured thereon and engage the inner sides of the bearings. The outer face of the inner portion of each of the pulleys 6 may be centrally depressed to insure firm contact with the drive wheel of the automobile. This will also assist materially in centering the machine and preventing side draft.

Threaded rods 8 extend along the inner sides of the beams 2 and are mounted in brackets 9 secured to said beams. Crank handles 10 are provided at the upper outer ends of the rods 8 and serve as convenient means for rotating said rods when occasion requires. Stops 11 are mounted upon the threaded rods 8 and are adapted to be thrown upward into operative position or turned downward so as to be out of the way. The stops 11 are maintained in operative position, by engaging the inner sides of the inclined ways or beams 2 and they project above the upper sides of the beams 2 and engage the rear or drive axle of the automobile, as indicated in Figure 3.

The appliance is of a portable nature and may be carried upon the running board of an automobile so as to be transmitted thereby to the required place of use. In practice, the device is adjusted beneath the rear axle of an automobile or motor vehicle with the axle in contact with the upper sides of the beams 2. The stops 11 are now turned into upright position to engage the front side of the axle. The threaded rod 8 being rotated, the stops 11 are advanced thereby drawing the axle upwardly upon the beams 2. This operation is continued until the drive wheels of the automobile are brought into proper engagement with the pulleys 6. The motor of the automobile being set in motion and the clutch operated to throw the machine in gear, the shaft 5 is driven by contact of the pulleys 6 with the drive wheels of the machine. Power is taken from the shaft 5 for driving the mechanism to be operated in any preferred way, usually by means of a drive belt applied to one or both of the pulleys 6.

What is claimed is:

1. An appliance for utilizing the power of an automobile for driving light machinery, the same comprising a frame including inclined ways, a transverse shaft mounted upon the frame and having pulleys at opposite ends to engage frictionally with the drive wheels of the automobile, threaded rods mounted on the inner sides of the inclined ways, and stops mounted on the threaded rods and maintained in operative position by engaging the inner sides of the inclined ways and movable on the rods and along the inclined ways by rotation of said rods.

2. An appliance of the character specified, comprising a base, side beams inclining upwardly and rearwardly from an end of the base, uprights inclining upwardly and forwardly from the opposite end of the base and joined to the upper rear ends of the side beams, cross braces connecting the uprights, a transverse shaft mounted upon the uprights, stepped pulleys at opposite ends of the transverse shaft, brackets on the inner sides of said beams, threaded rods mounted in said brackets and provided with operating crank handles, and stops mounted on the threaded rods and normally held in operative position by engaging the inner sides of said beams, said stops being movable along the threaded rods and adapted to be turned to occupy an operative or an inoperative position.

In testimony whereof I affix my signature in presence of two witnesses.

RAY F. BOSARD.

Witnesses:
F. D. FREEBORN,
JAMES G. WAKLEY.